(12) United States Patent
Orioku et al.

(10) Patent No.: US 12,352,331 B2
(45) Date of Patent: Jul. 8, 2025

(54) VIBRATION DAMPER, VIBRATION DAMPING APPARATUS, MOUNTING METHOD OF VIBRATION DAMPER, AND VIBRATION DAMPING METHOD

(71) Applicant: NOK CORPORATION, Tokyo (JP)

(72) Inventors: Yutaka Orioku, Tottori (JP); Naoya Iwata, Tottori (JP)

(73) Assignee: NOK CORPORATION, Tokyo (JP)

( * ) Notice: Subject to any disclaimer, the term of this patent is extended or adjusted under 35 U.S.C. 154(b) by 393 days.

(21) Appl. No.: 17/918,457

(22) PCT Filed: Apr. 27, 2021

(86) PCT No.: PCT/JP2021/016743
§ 371 (c)(1),
(2) Date: Oct. 12, 2022

(87) PCT Pub. No.: WO2021/230069
PCT Pub. Date: Nov. 18, 2021

(65) Prior Publication Data
US 2023/0144479 A1 May 11, 2023

(30) Foreign Application Priority Data

May 12, 2020 (JP) ................................. 2020-084043

(51) Int. Cl.
*F16F 15/04* (2006.01)
(52) U.S. Cl.
CPC .................................... *F16F 15/04* (2013.01)
(58) Field of Classification Search
CPC ....................................................... F16F 15/04
(Continued)

(56) References Cited

U.S. PATENT DOCUMENTS

| 144,514 A | * | 11/1873 | Curtis | ..................... B60G 11/42 |
| | | | | 267/30 |
| 854,426 A | * | 5/1907 | Lowry | ..................... F16D 3/60 |
| | | | | 464/69 |

(Continued)

FOREIGN PATENT DOCUMENTS

| CN | 103195863 | 7/2013 |
| EP | 0 919 725 | 6/1999 |

(Continued)

OTHER PUBLICATIONS

China Office Action issued in CN application No. 202180006846.4, dated May 22, 2024.

(Continued)

*Primary Examiner* — Melanie Torres Williams
(74) *Attorney, Agent, or Firm* — GREENBLUM & BERNSTEIN, P.L.C.

(57) ABSTRACT

Two or more target points different in amplitude in a natural mode, which exist in a housing of an object to be damped such as an engine, a gearbox, motors, or the like are located. Among these target points, an arm is fixed at a position relatively small in amplitude, and a vibration absorber provided at the free end of the arm is pressed against a position (relatively large in amplitude. When vibrations occur in the object, the vibration absorber holds the target point relatively large in amplitude while the arm is following the vibrations of the target.

6 Claims, 9 Drawing Sheets

(58) Field of Classification Search
USPC .......................................................... 267/30
See application file for complete search history.

(56) References Cited

U.S. PATENT DOCUMENTS

| | | | | |
|---|---|---|---|---|
| 1,287,858 | A * | 12/1918 | Brewster | B60G 11/42 |
| | | | | 267/45 |
| 1,581,588 | A * | 4/1926 | Masury | B60P 3/22 |
| | | | | 410/87 |
| 5,542,220 | A | 8/1996 | Yoshimura et al. | |
| 6,092,997 | A | 7/2000 | Kimura et al. | |
| 6,676,101 | B2 * | 1/2004 | Platus | F16F 15/02 |
| | | | | 267/140.3 |
| 2019/0259566 | A1 | | 8/2019 | Enomoto et al. | |

FOREIGN PATENT DOCUMENTS

| | | |
|---|---|---|
| GB | 1196405 A * | 6/1970 |
| JP | 5-302643 | 11/1993 |
| JP | 7-207987 | 8/1995 |
| JP | 7-264804 | 10/1995 |
| JP | 2000-314442 | 11/2000 |
| JP | 2004-28124 | 1/2004 |
| JP | 2009-35864 | 2/2009 |
| JP | 2009-270587 | 11/2009 |
| JP | 2014-57406 | 3/2014 |
| JP | 2015-68461 | 4/2015 |
| JP | 5762906 | 8/2015 |
| JP | 2015-175405 | 10/2015 |
| JP | 2019-60454 | 4/2019 |
| JP | 2002-233103 | 8/2022 |
| WO | 2022/129710 | 6/2022 |

OTHER PUBLICATIONS

International Search Report Issued in International Patent Application No. PCT/JP2021/016743, dated Jul. 13, 2021.
Written Opinion issued in International Patent Application No. PCT/JP2021/016743, dated Jul. 13, 2021.
Extended European Search Report received in EP Application No. 21804181.2, dated May 31, 2024.

* cited by examiner

VIBRATION DAMPER, VIBRATION DAMPING APPARATUS, MOUNTING METHOD OF VIBRATION DAMPER, AND VIBRATION DAMPING METHOD

TECHNICAL FIELD

The present disclosure relates to a vibration damper, a vibration damping apparatus, a mounting method of the vibration damper, and a vibration damping method.

BACKGROUND ART

Various machines generate vibrations with their operation. Taking an automobile as an example, it is provided with many vibration sources such as an engine, motors, a compressor, and a gearbox. Each of these parts vibrates during operation and generates radiant sound. Nowadays, the electrification of automobiles is advancing day by day, and quietness has been required more than before. Therefore, even from this view, some measures are required.

Noise caused by vibrations of each part is roughly divided into two types. One of them is noise excited by the vibrations of a component being transferred to its support side. The other thereof is air-borne sound generated by the vibrations of a component propagating through the air.

Patent Documents 1 and 2 disclose antivibration devices each provided on an engine mount. These antivibration devices suppress the vibrations of a component from being transmitted to its support side, and reduce noise excited by the vibrations being transmitted to the support side.

PRIOR ART DOCUMENTS

Patent Documents

Patent Document 1: Japanese Patent Application Laid-Open No. 2009-270587
Patent Document 2: Japanese Patent Application Laid-Open No. 2019-060454

SUMMARY

Problem to be Solved

It is possible to take measures against the noise excited by the vibrations of the component being transmitted to its support side, by using the antivibration device as disclosed in each of Patent Documents 1 and 2, for example. On the other hand, this type of antivibration device does not reduce air-borne sound.

It is common to take noise measures against air-borne sound by a method of shielding a vibration source. For example, it is a measure to cover the vibration source with a shielding plate or a sound insulating material, or the like. However, a structure in which the vibration source is covered with something requires a large installation space, and high component cost is required for the structure itself. It cannot be said that this is an easily adoptable countermeasure when considering this restriction on the space and problems of cost, etc.

Therefore, it is desired to enable air-borne sound to be reduced with a simple configuration without requiring a large occupied space.

Means for Solving the Problem

One aspect of a vibration damper includes an arm fixed at a position relatively small in amplitude among two or more target points different in amplitude in a natural mode at a specific natural frequency, and a vibration absorber provided on the arm so as to hold a position relatively large in amplitude among the target points.

One aspect of a vibration damping apparatus includes an arm fixed at a position relatively small in amplitude among two or more target points different in amplitude in a natural mode at a specific natural frequency, and a vibration absorber provided on the arm so as to hold a position relatively large in amplitude among the target points.

One aspect of a mounting method of a vibration damper includes locating two or more target points different in amplitude in a natural mode at a specific natural frequency, fixing an arm at a position relatively small in amplitude among the target points, and pressing a vibration absorber provided on the arm against a position relatively large in amplitude among the target points.

One aspect of a vibration damping method includes, when vibrations occur in an object, causing an arm fixed at a position relatively small in amplitude among two or more target points different in amplitude in a natural mode at a specific natural frequency to follow the vibrations of the object, and while the arm is following the vibrations of the object, holding the position relatively large in amplitude among the target points by a vibration absorber provided on the arm.

Effect

Air-borne sound can be reduced with a simple configuration without requiring a large occupied space.

DESCRIPTION OF EMBODIMENTS

Embodiments of a vibration damper, a vibration damping apparatus, a vibration damping method, and a mounting method of the vibration damper will be described based on the drawings.

FIG. 4, FIGS. 8(A) to 8(F), and FIGS. 11(A) and 11(B) typically show vibration modes generated in an object O to be damped, that is, the form and state of vibrations. In each of these figures, the shades of achromatic color represent the magnitude of the amplitude of the vibrations. In the figure, the amplitude is represented only by three kinds of achromatic colors of light gray, dark gray and black, or two kinds of achromatic colors of light gray and dark gray, but this is merely an expression for convenience. In fact, the area between the shades should gradually change the shade. That is, the amplitude of vibrations does not change stepwise as represented by the shades of achromatic color in each of the above figures, and it changes smoothly regardless of whether or not the degree of its change is steep or gradual.

Description will be made according to the following items.

[One embodiment]
 (1) Overall configuration
 (2) Target point
 (3) Mounting method of vibration damper
 (4) Vibration damping method
[Another embodiment]
[Further embodiment]

One Embodiment

An object O to be damped is, for example, an automobile engine, motors, a compressor, a gearbox or the like. A vibration damper 1 is mounted to the object O. When the vibration damper 1 is mounted to the object O, a vibration damping apparatus 2 is configured. The vibration damper 1 and the vibration damping apparatus 2 reduce air-borne sound generated by vibrations generated in the object O propagating through the air.

(1) Overall Configuration

Figure 1:
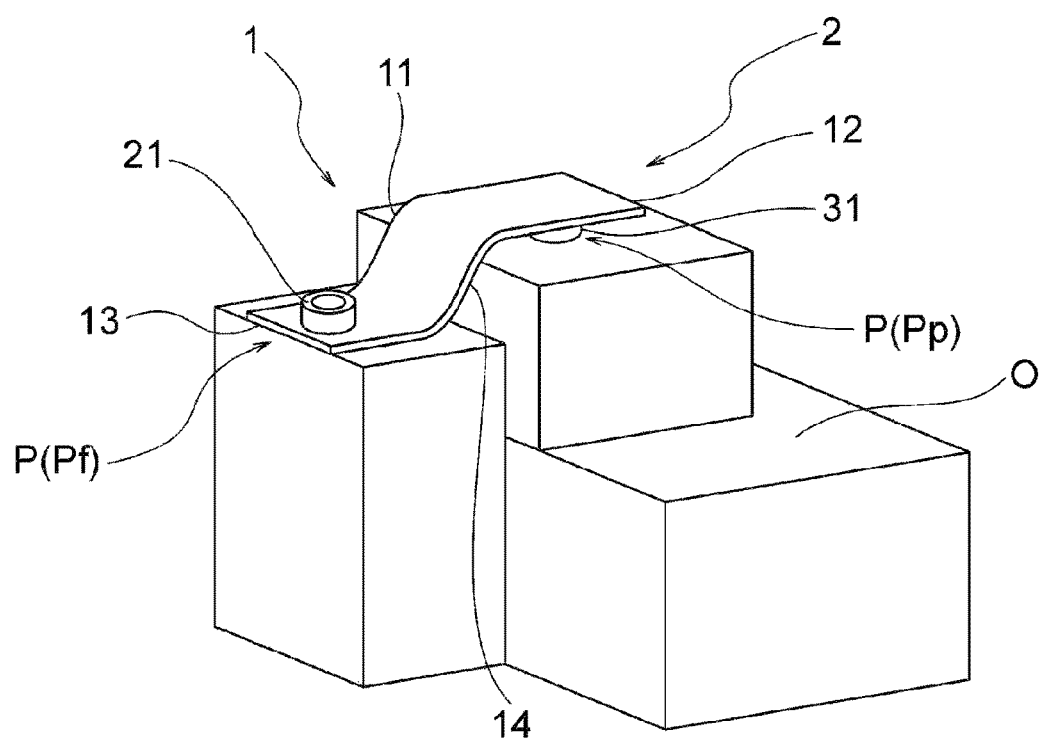
FIG. 1 is a perspective view showing one embodiment of a vibration damper mounted to an object.

As shown in FIG. 1, an arm 11 is fixed to the object O, and a vibration absorber 31 provided at the free end 12 of the arm 11 holds a part of the object O.

The arm 11 is a thin rectangular shaped member. A fixed end 13 is provided on the opposite side of the free end 12. The arm 11 has a bent section 14 between the free end 12 and the fixed end 13. As an example, the arm 11 is manufactured of a metal, a resin, or the like as a material and is given a spring property.

The fixing of the arm 11 to the object O is performed by, for example, screwing a fixing screw 21. The fixing screw 21 is passed through a through hole (not shown) provided in the fixed end 13 of the arm 11 and screwed into a screw hole (not shown) provided in the object O. The arm 11 is fastened to the object O by tightening the fixing screw 21.

The vibration absorber 31 is, for example, a cylindrical member having elasticity, which is made of rubber as a material. The vibration absorber 31 is fixed to the free end 12 of the arm 11 by a method such as adhesion or welding.

(2) Target Point

In the object O, the position where the arm 11 is fixed and the position where the vibration absorber 31 is pressed are target points P. These target points P are positions existing on the object O which are different in amplitude in a natural mode.

The position where the arm 11 is fixed is a position where the amplitude of vibrations is smaller than the position where the vibration absorber 31 is pressed. That is, the fixed end 13 of the arm 11 is fixed at the target point P relatively small in vibration amplitude. The vibration absorber 31 is positioned so as to hold down the target point P relatively large in vibration amplitude. For convenience of description, the target point P at which the arm 11 is fixed is referred to as a target point Pf, and the target point P against which the vibration absorber 31 is pressed is referred to as a target point Pp.

As described above, the two types of target points Pf and Pp are two target points P existing on the object O, which are different in amplitude in the natural mode. The natural mode at this time is a natural mode at a specific natural frequency. This point will be described with reference to FIG. 7.

Figure 7:
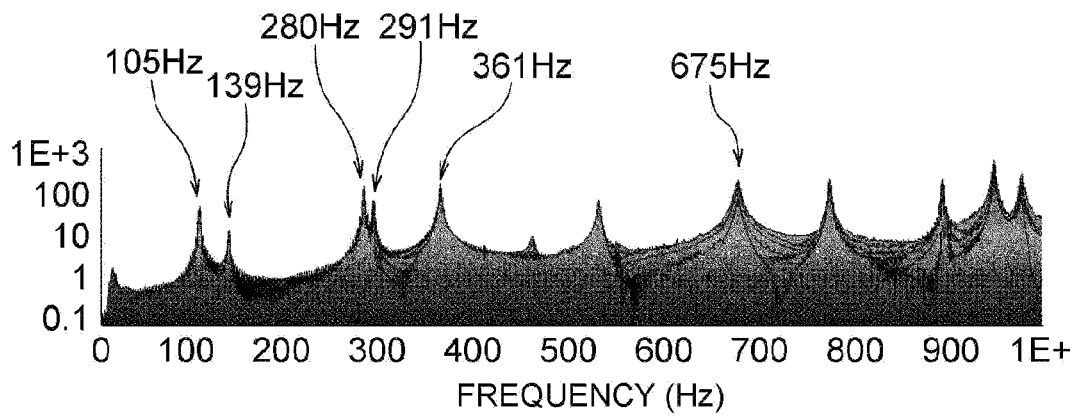
FIG. 7 is a graph showing the frequency response function of vibrations generated in the object.
Figure 8:
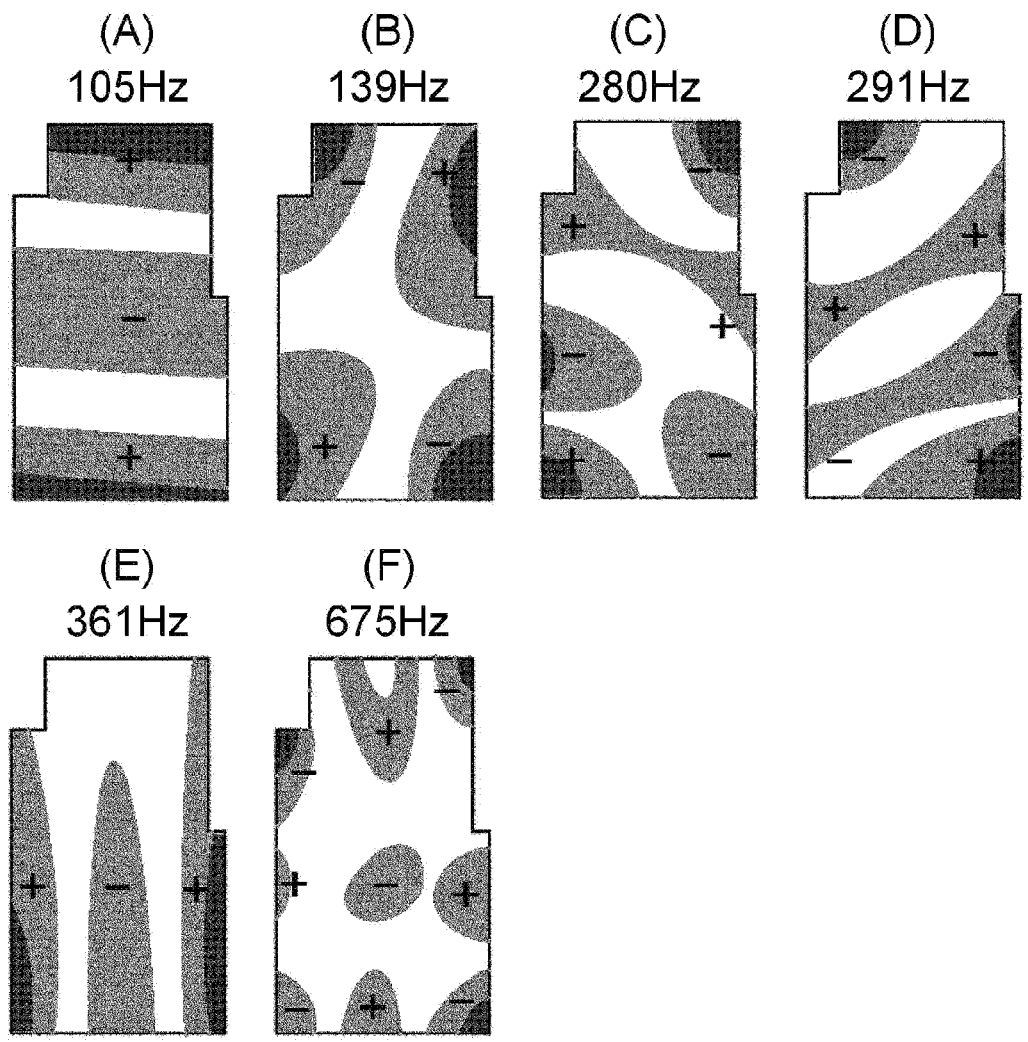
FIG. 8(A), FIG. 8(B), FIG. 8(C), FIG. 8(D), FIG. 8(E), and FIG. 8(F) are typical diagrams showing vibration modes of an object at 105 Hz, 139 Hz, 280 Hz, 291 Hz, 361 Hz, and 675 Hz respectively.

A graph shown in FIG. 7 shows a frequency response function (the ratio of an excitation force and response acceleration) when vibrations occur in the object O.

Figure 5:
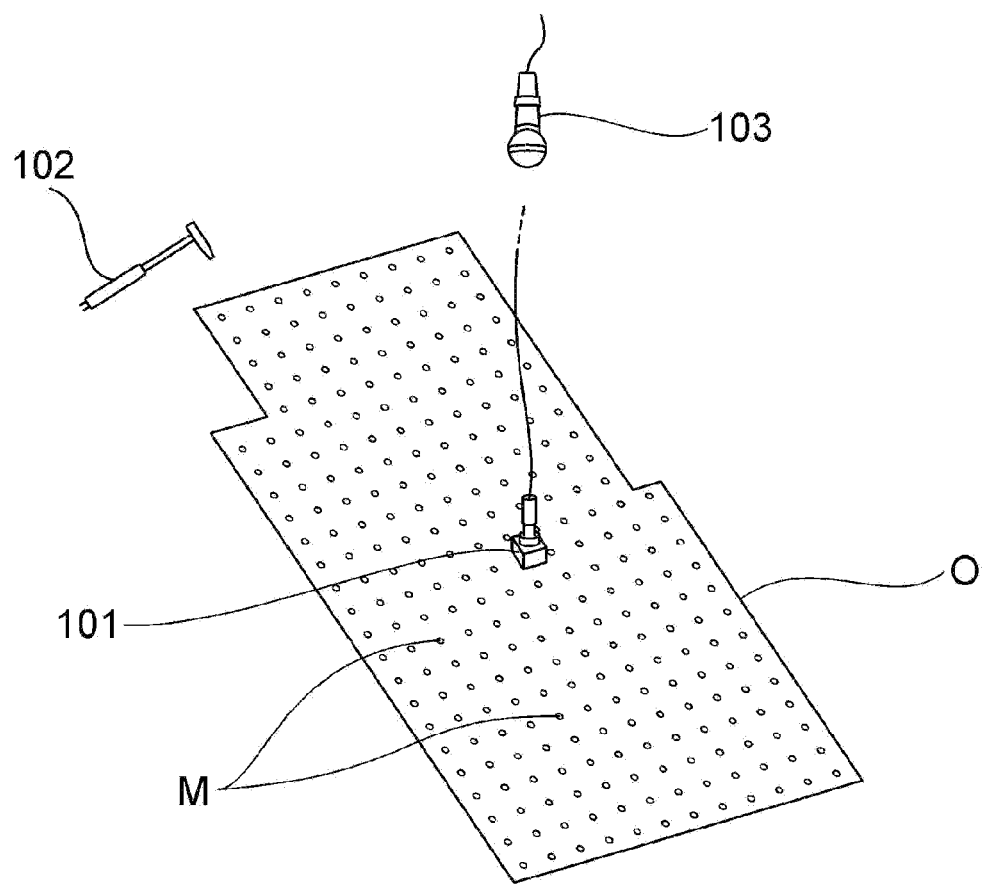
FIG. 5 is a typical diagram showing an experimental apparatus for collecting the amplitude of vibrations generated in an object.

More specifically, the intersections of cells generated by a plurality of positions of the object O, e.g., a plurality of virtual lines arranged in parallel vertically and horizontally at equal intervals are taken as measurement points respectively, and vibrations generated at the measurement points are measured by an acceleration sensor 101 (refer to FIG. 5). The vibrations are generated by hitting the object O with, for example, an impulse hammer 102. The graph of FIG. 7 shows the frequency response function calculated based on the output of the acceleration sensor 101 at this time. The frequency is taken on the horizontal axis, and the frequency response function of the vibrations is taken on the vertical axis.

As another embodiment, such a graph as shown in FIG. 7 can also be obtained as a Fourier spectrum. For that purpose, the output of the acceleration sensor 101 is collected for a predetermined time, for example, 10 seconds. Consequently, a time axis waveform of the output of the acceleration sensor 101 is obtained. Therefore, the time axis waveform is converted into a frequency spectrum by FFT (Fast Fourier Transform). Superimposing the frequency spectra at the individual measurement points thus obtained enables such a graph as shown in FIG. 7 to be obtained.

Referring to FIG. 7, it can be seen that peak waveforms appear around 105 Hz, 139 Hz, 280 Hz, 291 Hz, 361 Hz, and 675 Hz. Peak waveforms also occur in other frequencies, for example, a region between 500 Hz and 600 Hz, a region between 700 Hz and 800 Hz, etc., but they are eliminated in the present description.

FIGS. 8(A) to 8(F) respectively show the vibration mode of the object O at the above frequency at which each peak waveform appears. It can be seen that when focusing on 105 Hz shown in FIG. 8(A), for example, a large amplitude appearing in upper and lower regions of the object O decreases toward a central region, and the decreased amplitude increases in the central region. The amplitude of the vibrations generated in the central region is smaller than the amplitude of the vibrations generated in the upper and lower regions.

+− represented in FIGS. 8(A) to 8(F) indicates the vibration mode generated in the object O by the hitting of the impulse hammer 102. In the same drawings, + indicates that the amplitude is generated on the front side, and − indicates that the amplitude is generated on the deep side.

As is obvious from FIGS. 8(A) to 8(F), the white region becomes a vibration node (node), and the dark gray region becomes a vibration antinode (antinode).

As an example, the target point Pf to fix the fixed end 13 of the arm 11 is set at the position of the vibration node, and the target point Pp against which the vibration absorber 31 is pressed is set at the position of the antinode of the vibrations. Of course, the positions of the two target points Pf and Pp are not necessarily limited to the vibration node and antinode. The position where the vibration amplitude is relatively small may be set to the target point Pf, and the position where the vibration amplitude is comparatively large may be set to the target point Pp.

(3) Mounting Method of Vibration Damper

The method of mounting the vibration damper 1 to the object O is executed by three steps of a target point search step, a fixing step, and an alignment step.

The target point search step is a step of locating two or more target points P different in amplitude in a natural mode at a specific natural frequency, which exist on the object O.

The specific natural frequency at this time is the frequency at which the peak waveform such as illustrated in FIG. 7, for example appears. As is also clear from FIG. 7, the natural frequency is not limited to one, and exists in plural. Which natural frequency is selected as a specific natural frequency may be determined from the correspondence relationship with the air-borne sound to be reduced. That is, the natural frequency that leads to the air-borne sound to be reduced is found out, and this natural frequency is selected as a specific natural frequency.

When the specific natural frequency is determined, the vibration mode of the object O at this natural frequency is analyzed, and two or more target points P different in vibration amplitude are set. It is assumed that in FIG. 7, for example, 291 Hz is selected as a specific natural frequency. The vibration mode of the object O at this frequency is as shown in FIG. 8(D). Referring to FIG. 8(D), two or more target points P different in vibration amplitude can be found everywhere.

For example, in FIG. 8(D), vibration antinodes (antinodes) appear at the upper left corner and the lower right corner of the object O, and at the position slightly above the lower right corner. Consequently, it is possible to select these positions of the vibration antinodes and other than the antinodes thereof as two or more target points P different in vibration amplitude.

The fixing step is a step of defining a position relatively small in amplitude among the found target points P, for example, a vibration node (node) as the target point Pf, and fixing the arm 11 at this target point Pf.

For example, in FIG. 8(D), a white region becomes a vibration node. Further, a light gray region is smaller in amplitude than a dark gray region which serves as the antinode of the vibrations. Therefore, either the white region or the light gray region may be defined as the target point Pf, and the arm 11 may be fixed at this target point Pf.

The alignment step is a step of defining a position relatively large in amplitude among the found target points P, for example, a vibration antinode (antinode) as a target point Pp, and pressing the vibration absorber 31 provided on the arm 11 against this target point Pp.

For example, in FIG. 8(D), the dark gray region becomes the antinode of vibrations. Therefore, the dark gray region may be defined as the target point Pp, and the vibration absorber 31 provided on the arm 11 may be pressed against the target point Pp. The pressing of the vibration absorber 31 against the target point Pp can be easily realized by setting the mounting angle of the arm 11 as appropriate on the premise that the fixing position of the vibration absorber 31 with respect to the arm 11 is appropriately determined.

(4) Vibration Damping Method

The vibration damping method of the object O is executed by two steps of a follow-up step and a pressing step.

The follow-up step is a step in which when vibrations occur in the object O, the arm 11 fixed at the position (target point Pf) relatively small in amplitude among two or more target points P different in amplitude in the natural mode, which exist on the object O follows the vibrations of the object O.

The follow-up of the arm 11 to the vibrations of the object O occurs in the entire arm 11 including the fixing position by the fixing screw 21. When the arm 11 is fixed to the vibration node, no amplitude occurs in this position. Therefore, the follow-up of this part means that the object O and the arm 11 which do not cause displacement are integrated. On the other hand, in a portion other than the vibration node, the arm 11 follows the vibrations of the object O through the vibration absorber 31.

The pressing step is a step in which while the arm 11 is following the vibrations of the object O, the vibration absorber 31 provided on the arm 11 holds the position (target point Pp) relatively large in amplitude, of the target points P.

Figure 2:
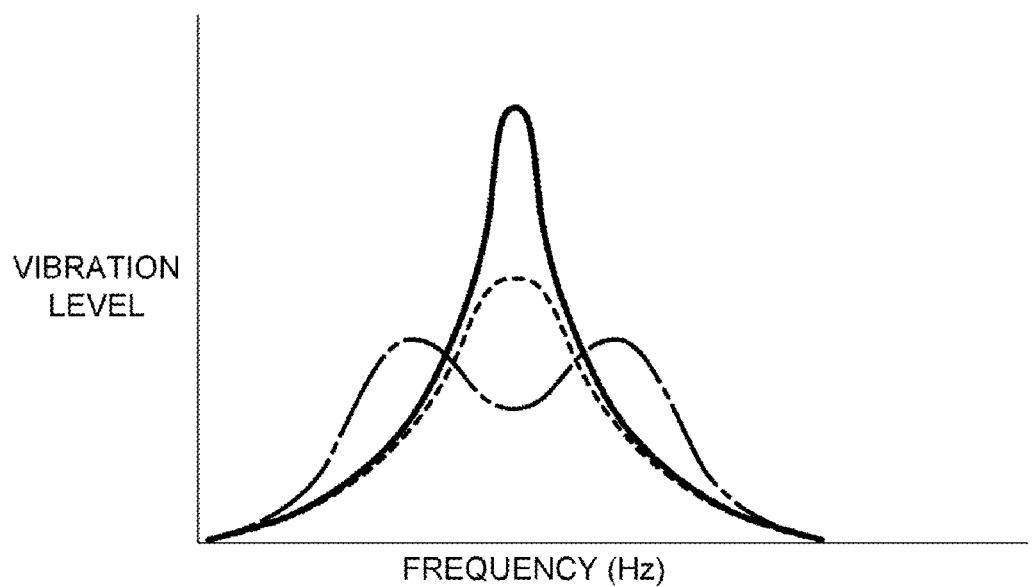
FIG. 2 is a graph showing by comparison vibration levels of the object in three aspects of the absence of the vibration damper, the presence of the vibration damper (absence of a mass body), and the presence of the vibration damper (presence of the mass body).

In FIG. 2, the amplitude of the vibrations generated in the object O to which the vibration damper 1 is not mounted is indicated by a solid line. The amplitude of the vibrations generated in the object O to which the vibration damper 1 is mounted is indicated by a dotted line. When the pressing step is executed, the amplitude of the vibrations generated in the object O becomes small. This will be described in detail with reference to FIG. 7 to FIGS. 11(A) and 11(B).

It is assumed that, for example, 280 Hz is defined as a specific natural frequency in the mounting method of the vibration damper (refer to FIG. 7). In the target point search step, two or more target points P different in amplitude in the natural mode of 280 Hz are found out.

Figure 9:
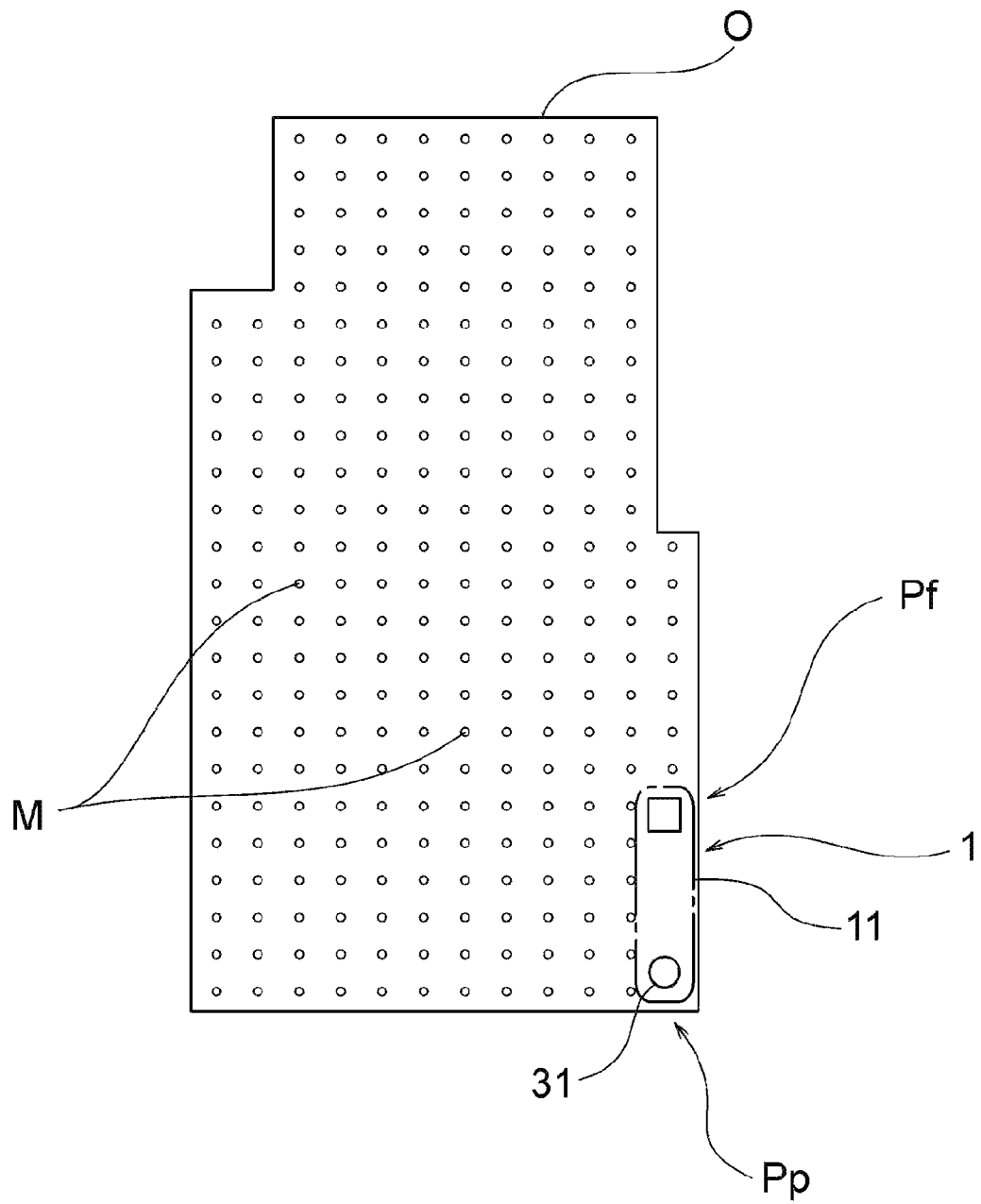
FIG. 9 is a typical diagram showing an example (without a mass body) of a prototype for verifying the effect of a vibration damper.
Figure 10:
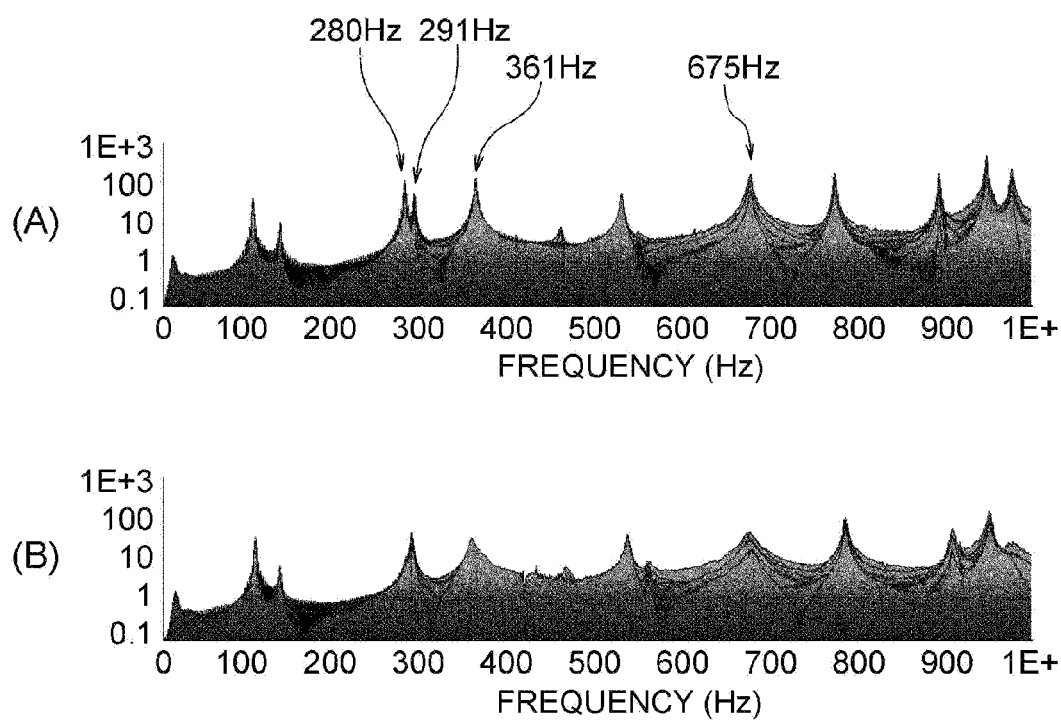
FIGS. 10(A) and 10(B) are respectively graphs showing the frequency response function of vibrations generated in an object in the absence of the vibration damper and the presence of the vibration damper (with no mass body).
Figure 11:
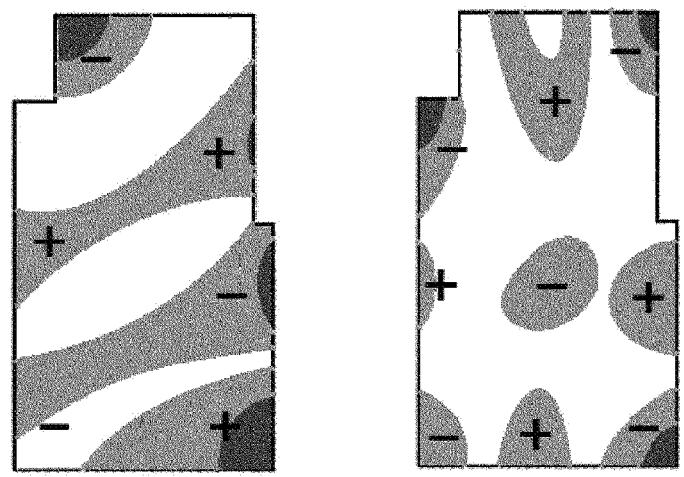
FIGS. 11(A) and 11(B) are graphs showing vibration modes of an object at 291 Hz and 675 Hz respectively.

As shown in FIG. 8(C), in the vibration mode of 280 Hz, a vibration node appears at a position slightly above the lower right corner of the object O (white region), and an amplitude region appears at the lower right corner (light gray region). Thus, as shown in FIG. 9, the target point Pf is defined slightly above the lower right corner of the object O, and the target point Pp is defined at the lower right corner. The vibration damper 1 is mounted to the object O.

FIGS. 10(A) and 10(B) are respectively graphs showing a frequency response function which is a ratio between an exciting force of vibrations generated in the object O and response acceleration. FIG. 10(A) shows the frequency response function of the object O with no vibration damper 1 mounted thereto, and FIG. 10(B) shows the frequency response function of the object O with the vibration damper 1 mounted thereto, respectively. It can be seen that comparing FIGS. 10(A) and 10(B), the peak waveforms (refer to FIG. 10(A)) that appeared at 280 Hz and 291 Hz in the case of the absence of the vibration damper 1 become such a waveform as shown in FIG. 10(B). Such a change is not only the waveform, but also the amplitude is reduced when comparing FIGS. 10(A) and 10(B).

From the above results, it can be seen that the amplitude of the vibrations generated in the object O becomes small.

In addition, as shown in FIG. 10(B), the amplitude of the vibrations generated in the object O at 675 Hz is also reduced. This results from that in the above-described target point search step, the target point Pf at which the arm 11 is fixed and the target point Pp against which the vibration absorber 31 is pressed are set at the positions to be antiphase to each other between other two frequencies different from 280 Hz being the specific natural frequency. The other two frequencies are 291 Hz and 675 Hz.

Refer to FIGS. 11(A) and 11(B). FIG. 11(A) is a vibration mode generated in the object O at 291 Hz. On the other hand, FIG. 11(B) is a vibration mode generated in the object O at 675 Hz. Focusing on the position of the target point Pp held by the vibration absorber 31 of the vibration damper 1, in the vibration mode at 291 Hz, the target point Pf is − and the target point Pp is + (refer to FIG. 11(A)). In the vibration mode at 675 Hz, the target point Pf is + and the target point Pp is − (refer to FIG. 11(B)). That is, when the vibration modes of 291 Hz and 675 Hz are compared, it can be seen that the two target points Pf and Pp are set at positions antiphase to each other.

It is presumed that the decrease in the amplitude of the vibrations generated in the object O at the frequency of 675 Hz is due to the relationship of the above antiphase.

According to the present embodiment, the amplitude of the vibrations generated in the object O becomes small by execution of the pressing step. Therefore, the air-borne sound generated by the vibrations of the object O propagating through the air is also reduced. Moreover, as is clear even from FIG. 1, the vibration damper 1 is small in size and simple in structure as well. Thus, it is possible to easily reduce the air-borne sound without requiring a large occupied space.

Another Embodiment

Figure 3:
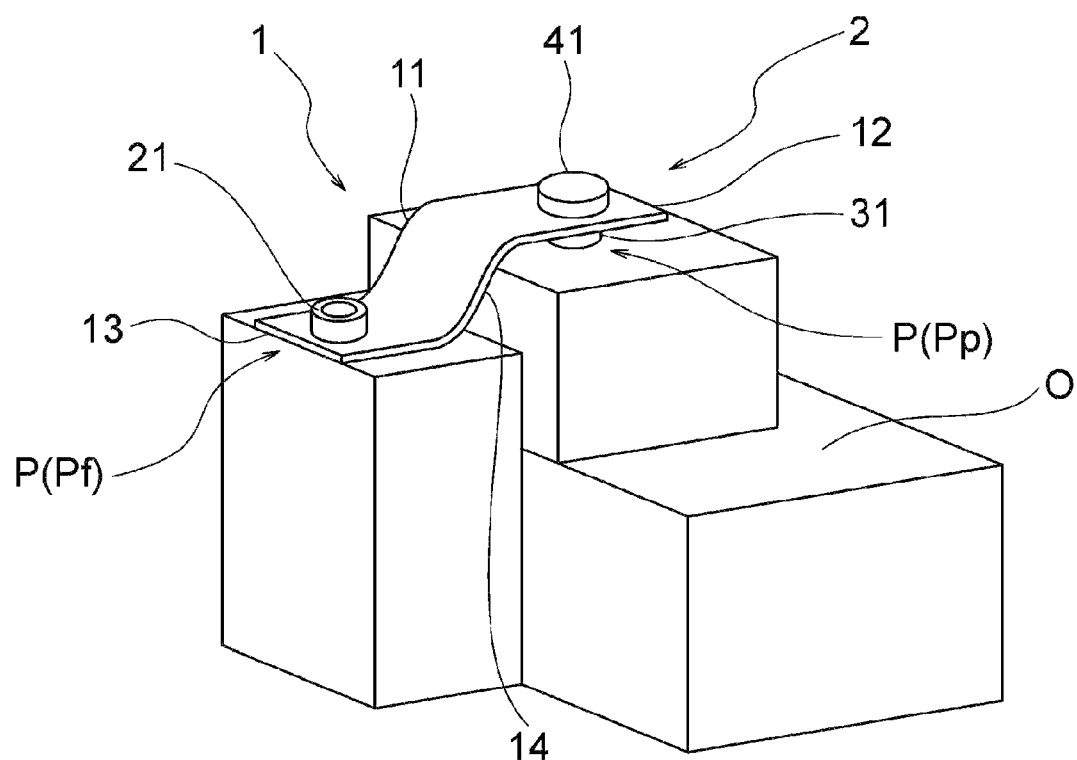
FIG. 3 is a perspective view showing another embodiment of a vibration damper mounted to an object.

Another embodiment will be described based on FIG. 3. The same parts as those of the embodiment shown in FIG. 1 are designated by the same reference numerals, and the description thereof will also be omitted.

In the vibration damper 1 of the present embodiment, a mass body 41 is fixed to the surface of an arm 11 at the free end 12. The mass body 41 is fixed at the surface opposite to the vibration absorber 31.

The mass body 41 absorbs the vibrations of a natural frequency and reduces the vibrations of an object O.

In FIG. 2, the one-dot chain line indicates the amplitude of vibrations generated in the object O when the mass body 41 is fixed to the vibration damper 1. It can be seen that the amplitude of the vibrations generated in the object O becomes even smaller than that when the vibration damper 1 with no mass body 41 is mounted to the object O (refer to the dotted line). Thus, the air-borne sound generated by the vibrations of the object O propagating through the air is further reduced.

Further Embodiment

Figure 4:
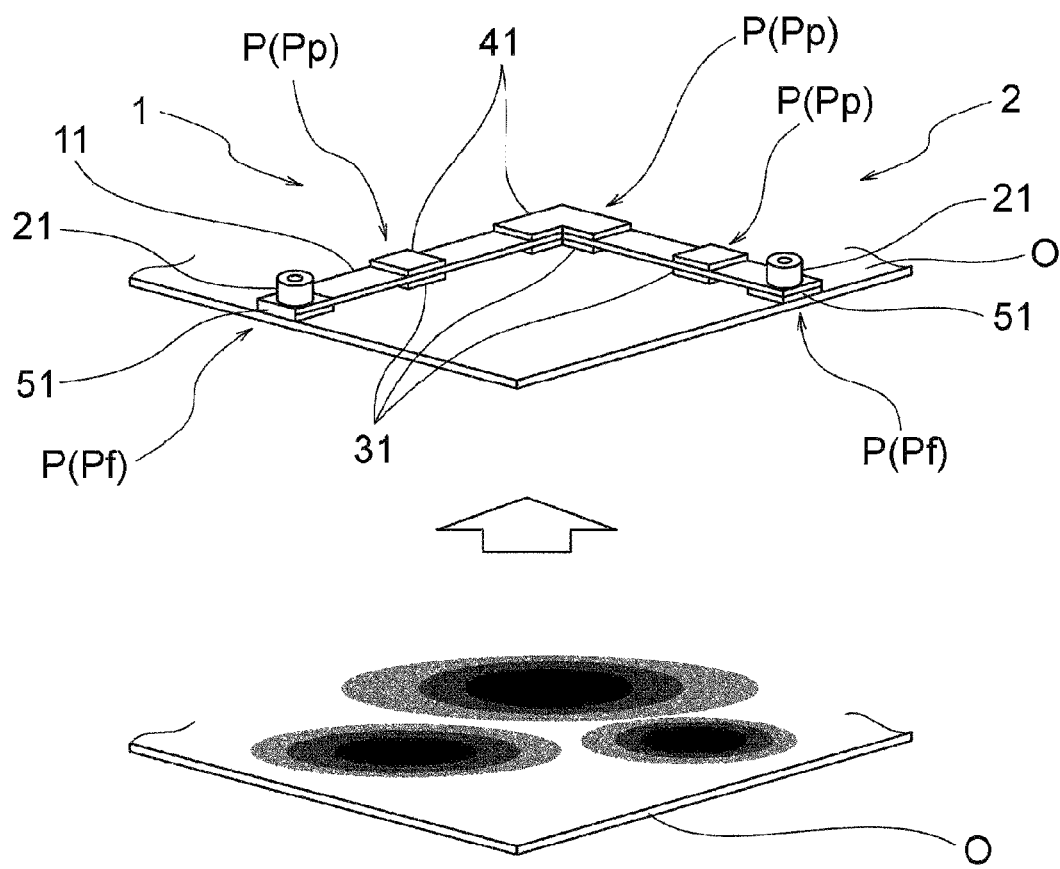
FIG. 4 is a perspective view showing a further embodiment of a vibration damper mounted to an object in association with a vibration mode of the object.

A further embodiment will be described based on FIG. 4. The same parts as those of another embodiment shown in FIG. 3 are indicated by the same reference numerals, and the description thereof will also be omitted.

A vibration damping apparatus 2 of the present embodiment defines two target points Pf and three target points Pp so as to match a vibration mode of an object O exemplified below in FIG. 4 and includes a vibration damper 1 mounted to these target points P.

The vibration damper 1 includes an arm 11 which is bent 90 degrees to form an L-shape, and two ends of the arm 11 which are fixed to the object O. These fixed positions are the target points Pf. At this time, a spacer 51 is interposed at the target point Pf to secure a gap between the arm 11 and the object O. The gap is a space for arranging a vibration absorber 31 fixed to the lower surface of the arm 11 facing the object O. The vibration absorber 31 is fixed at three points of a bent position of the arm 11 and central positions of two sides thereof. These positions are the target points Pp. A mass body 41 is fixed to the front surface of the arm 11 which corresponds to the back surface of the vibration absorber 31.

As in the present embodiment, the target point Pf may be two or more, and the target point Pp may be three or more. The vibration damper 1 of the present embodiment is fixed at these target points Pf, and hence each target point Pp can be held by the vibration absorber 31.

Exemplary Embodiments

The inventors who created the embodiments of the vibration damper, the vibration damping apparatus, the mounting method of the vibration damper, and the vibration damping method have conducted experiments to confirm their effects.

(1) Experimental Device

As shown in FIG. 5, an experimental device is configured to be capable of regarding a flat plate-shaped SPHC steel plate as an object O, setting respective intersections of cells generated by a plurality of virtual lines arranged in parallel vertically and horizontally at equal intervals as measurement points, and measuring vibrations generated at these measurement points by an acceleration sensor 101.

At this time, instead of arranging the acceleration sensor 101 at each measurement point, it was so planned that the vibrations generated at all the measurement points could be measured by one acceleration sensor 101 arranged in the central part of the object O. As a configuration for that purpose, all the measurement points were given dot-shaped markings M. This is an attempt to obtain data of vibrations equivalent to the vibrations generated at all measurement points by collecting the vibrations generated in the object O by the acceleration sensor 101 when the position of each marking M is hit with an impulse hammer 102.

The experimental device is further provided with a microphone 103 directly above the acceleration sensor 101 to enable collection of sound when the object O is hit with the impulse hammer 102.

(2) Vibration and Sound

A graph shown in FIG. 6(A) shows a frequency response function when vibrations occur in the object O. In order to obtain the graph of FIG. 6(A), the position of the marking M given to the object O as a measurement point is hit with the impulse hammer 102. The frequency response function is calculated based on the output of the acceleration sensor 101 at this time. By superimposing the frequency response functions when the positions of all markings M are hit, the graph shown in FIG. 6(A) is obtained.

Figure 6:
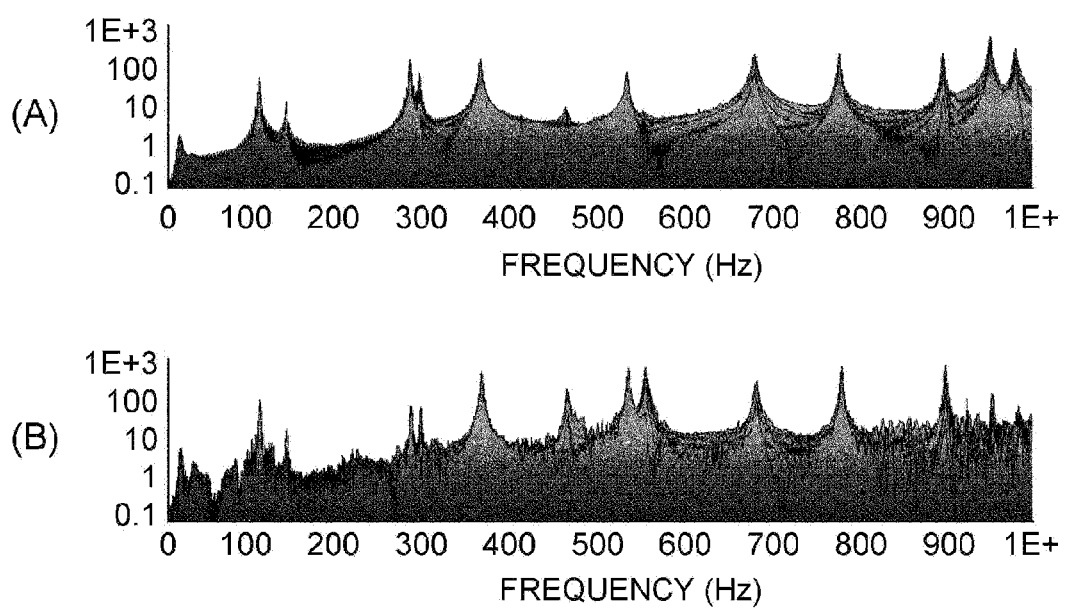
FIG. 6(A) is a graph showing the frequency response function of the vibrations generated in the object.
FIG. 6(B) is a graph showing a frequency response function of radiated sound at that time.

A graph shown in FIG. 6(B) shows a frequency response function when vibrations occur in the object O. In order to obtain the graph of FIG. 6(B), the position of the marking M given to the object O as a measurement point is hit with the impulse hammer 102. At this time, the frequency response function is calculated based on an acoustic signal picked up from the microphone 103. By superimposing the frequency response functions when the positions of all markings M are hit, the graph shown in FIG. 6 (B) is obtained.

Comparing FIGS. 6(A) and 6(B), it can be seen that peak frequencies match between acceleration obtained from the output of the acceleration sensor 101 and sound obtained from the output of the microphone 103. This shows that when vibrations are generated in the object O, the vibrations propagate in the air to generate air-borne sound. The graphs of FIGS. 6(A) and 6(B) proves that the vibrations generated in the object O and the air-borne sound based on it correspond to each other. Thus, the experimental results shown in FIGS. 6(A) and 6(B) become one proof that the air-borne sound can be reduced by attenuating the vibrations.

(3) Confirmation of Vibration Reduction Effect

FIG. 7 is a graph representing in characters, 105 Hz, 139 Hz, 280 Hz, 291 Hz, 361 Hz, and 675 Hz in which peak waveforms appear in the graph shown in FIG. 6(A). FIG. 8(A) to 8(F) are respectively typical diagrams showing the vibration mode of the object O at the frequency at which the peak waveform appears, that is, the natural frequency. By referring to the typical diagrams shown in FIGS. 8(A) to 8(F), the shape and magnitude of the vibration amplitude are obvious at a glance for each natural frequency at which the peak waveform appears.

Therefore, the inventors have made the prototype in which the two or more target points P on the object O different in amplitude in the natural mode at the specific natural frequency are set, and as shown in FIG. 9, the vibration damper 1 is mounted to the positions thereof. The mounting of the vibration damper 1 was conducted by fixing the arm 11 at the position where the amplitude is relatively small (target point Pf) and positioning the vibration absorber 31 so as to hold the position where the amplitude is relatively large.

The position of the marking M was hit again with the impulse hammer 102 with respect to the object O to which the vibration damper 1 was mounted, to create a graph similar to that in FIG. 6(A). The result is the graph shown in FIG. 10(B). The graph shown in FIG. 10(A) is the same graph as that shown in FIG. 6 (A) for comparison with FIG. 10(B).

As a result, the inventors have also confirmed that the amplitude of the peak waveform (refer to FIG. 10(A)) having appeared at each of 280 Hz and 291 Hz in the case of the absence of the vibration damper 1 is reduced by providing the vibration damper 1.

From the above experimental results, it was proved that the amplitude of the vibrations generated in the object O became small by mounting the vibration damper 1 to the object O. It was proved that this could also reduce air-borne sound.

Also, as shown in FIGS. 11(A) and 11(B), the inventors have confirmed that the amplitude of the vibrations generated in the object O becomes small even by setting the target point Pf at which the arm 11 is fixed and the target point Pp against which the vibration absorber 31 is pressed, at the positions to be antiphase between two frequencies (291 Hz and 675 Hz). As shown in FIG. 10(B), it is at the frequency of 675 Hz that the amplitude of the vibrations is reduced.

Figure 12:
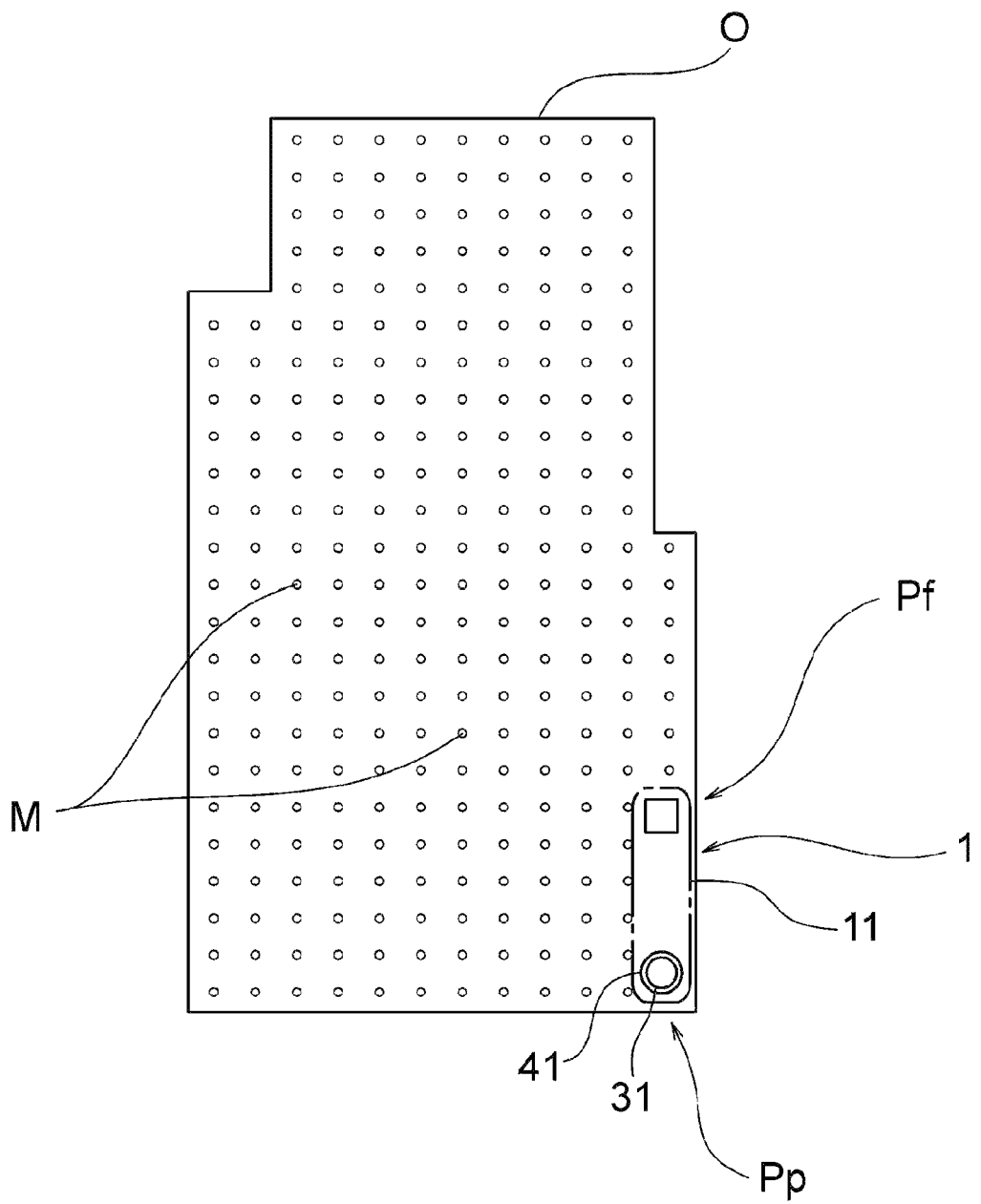
FIG. 12 is a typical diagram showing another example (with a mass body) of a prototype for verifying the effect of a vibration damper.

Further, as shown in FIG. 12, the inventors have created a prototype in which a vibration damper 1 is provided with a mass body 41, and repeated the same experiment as for the prototype (with no mass body) shown in FIG. 9. As a result, as shown in FIGS. 13(A) and 13(B), a further vibration reducing effect was confirmed.

Figure 13:
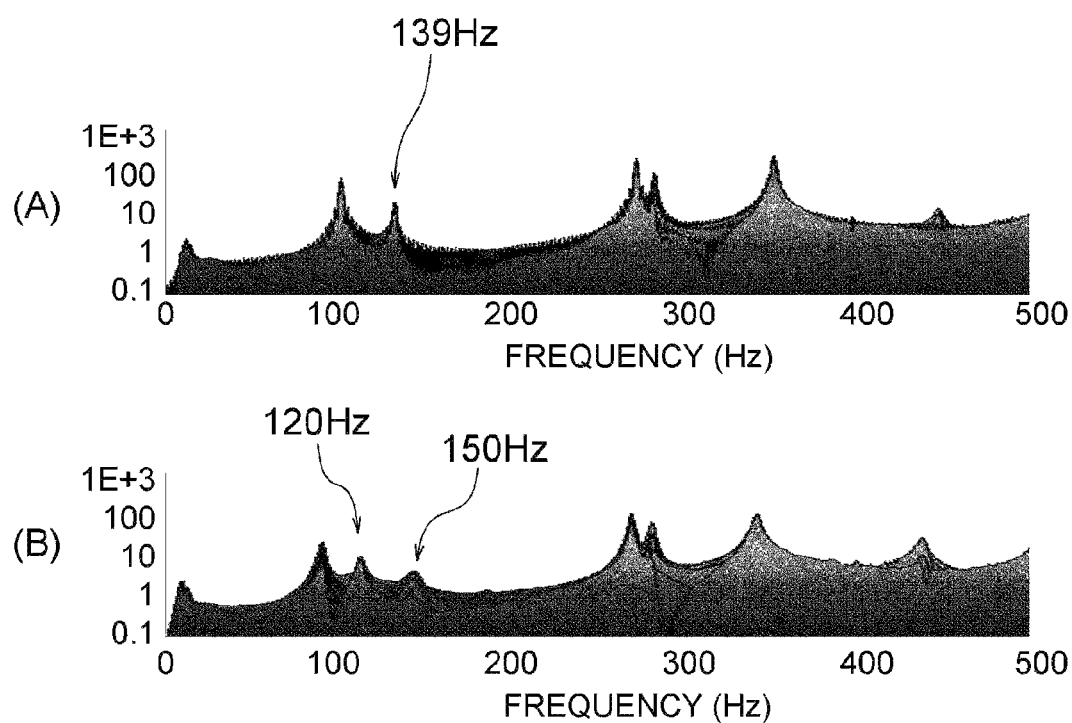
FIGS. 13(A) and 13(B) are respectively graphs showing the frequency response function of vibrations generated in an object in the absence of the vibration damper and the presence of the vibration damper.

A graph shown in FIG. 13(A) shows an experimental result in a configuration with no vibration damper 1, and a graph shown in FIG. 13(B) shows an experimental result using the prototype shown in FIG. 12, respectively. Both show a frequency response function of each measurement point (marking M) in the vicinity of 139 Hz.

In the configuration with no vibration damper 1 shown in FIG. 13(A), two peak waveforms appear at 105 Hz and 139 Hz. On the other hand, in the prototype with both the vibration damper 1 and the mass body 41 in FIG. 13(B), the peak waveform of 139 Hz is divided into two (120 Hz and 150 Hz), and the amplitude thereof becomes small.

From the above-described experimental results, it was proved that by mounting the vibration damper 1 with the mass body 41 to the object O, the amplitude of the vibrations generated in the object O was further reduced in a specific frequency region. This has proved that the air-borne sound can be further reduced.

DESCRIPTION OF REFERENCE NUMERALS

1 vibration damper
2 vibration damping apparatus
11 arm
12 free end
13 fixed end
14 bent section
21 fixing screw
31 vibration absorber
41 mass body
51 spacer
P target point
Pf target point
Pp target point
O object
M marking
101 acceleration sensor
102 impulse hammer
103 microphone

The invention claimed is:

1. A vibration damping apparatus, comprising:
   an object having two or more target points thereon, wherein the two or more target points each have a different amplitude in a natural mode at a specific natural frequency;
   an arm fixed to the object at a fixed position coinciding with one of the two or more target points; and
   a vibration absorber provided on the arm at a distal position coinciding with another of the two or more target points,
   wherein the vibration absorber holds down the object at the distal position, and
   wherein the amplitude at the fixed position is smaller than the amplitude at the distal position.

2. The vibration damping apparatus according to claim 1, wherein the target point to fix the arm is the fixed position is a node of the amplitude.

3. The vibration damping apparatus according to claim 1, wherein the distal position is an antinode of the amplitude at the fixed position.

4. A vibration damping apparatus, comprising:
   an object having two or more target points thereon, wherein the two or more target points each have a different amplitude in a natural mode at a specific natural frequency;

an arm fixed to the object at a fixed position coinciding with one of the two or more target points; and a vibration absorber provided on the arm at a distal position coinciding with another of the two or more target points, wherein the vibration absorber holds down the object at the distal position, wherein the amplitude at the fixed position is smaller than the amplitude at the distal position, and wherein the one of two or more target points where the arm is fixed and the another of the two or more target points where the vibration absorber is pressed are located at positions where the amplitudes in a natural mode at two other natural frequencies different from the specific natural frequency are antiphase to each other.

5. A mounting method of a vibration damper comprising:

locating, on an object, two or more target points each having a different amplitude in a natural mode at a specific natural frequency;

fixing an arm at a fixed position coinciding with one of the two or more target points; and pressing a vibration absorber provided on the arm at a distal position coinciding with another of the two or more target points, the vibration absorber holding down the object at the distal position, and providing the amplitude at the fixed position to be smaller than the amplitude at the distal position.

6. A vibration damping method comprising:

providing an object having two or more target points thereon, each of the two or more target points having a different amplitude in a natural mode at a specific natural frequency;

in an occurrence of vibrations in the object, causing an arm fixed at a fixed position coinciding with one of the two or more target points to follow the vibrations of the object; and while the arm is following the vibrations of the object, holding the object with a vibration absorber provided on the arm at a distal position coinciding with another of the two or more target points, the vibration absorber holding down the object at the distal position, and providing the amplitude at the fixed position to be smaller than the amplitude at the distal position.

* * * * *